June 13, 1967
T. W. CONRAD
3,325,621
ARC-PERCUSSIVE WELDING APPARATUS
Filed April 13, 1964
7 Sheets-Sheet 3
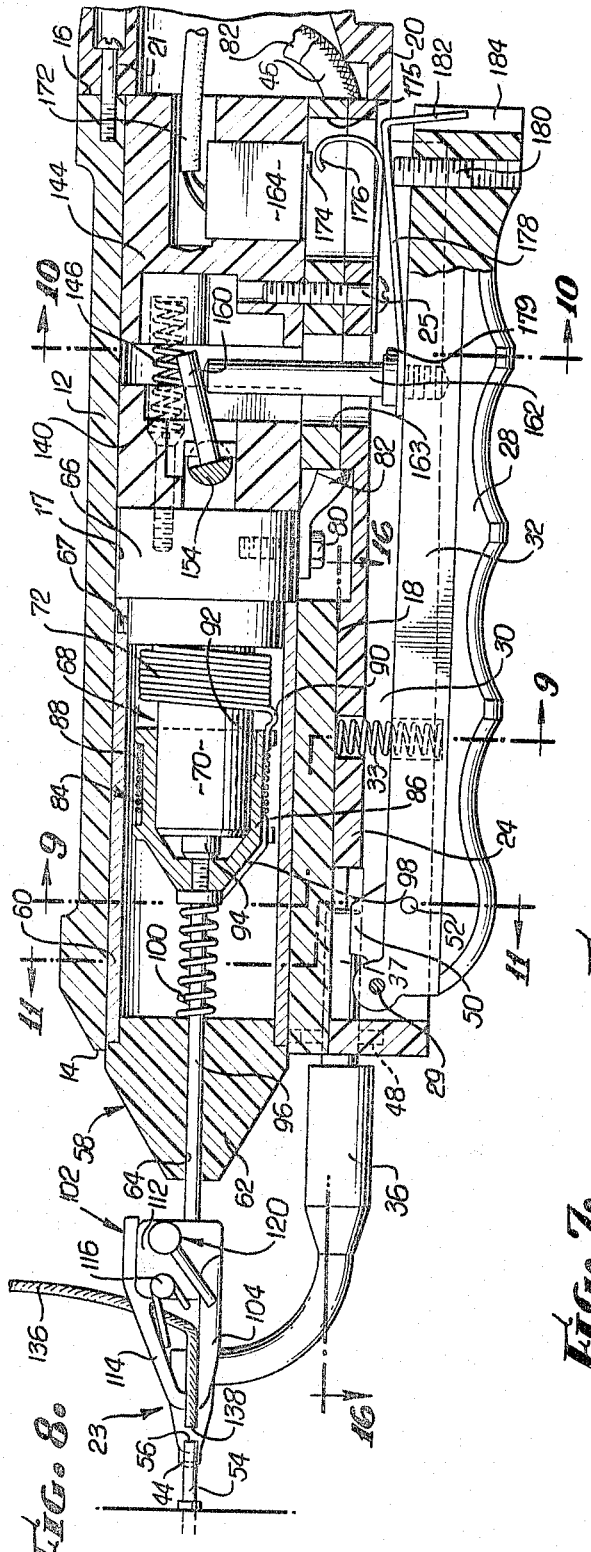
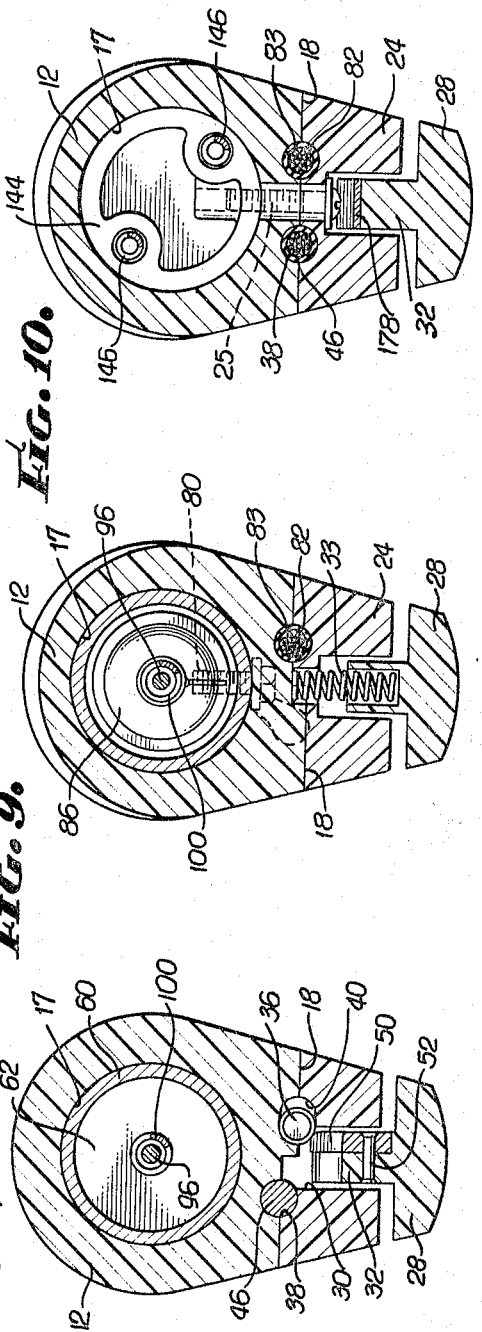
INVENTOR.
THOMAS W. CONRAD
BY Huebner & Worrel
ATTORNEYS.

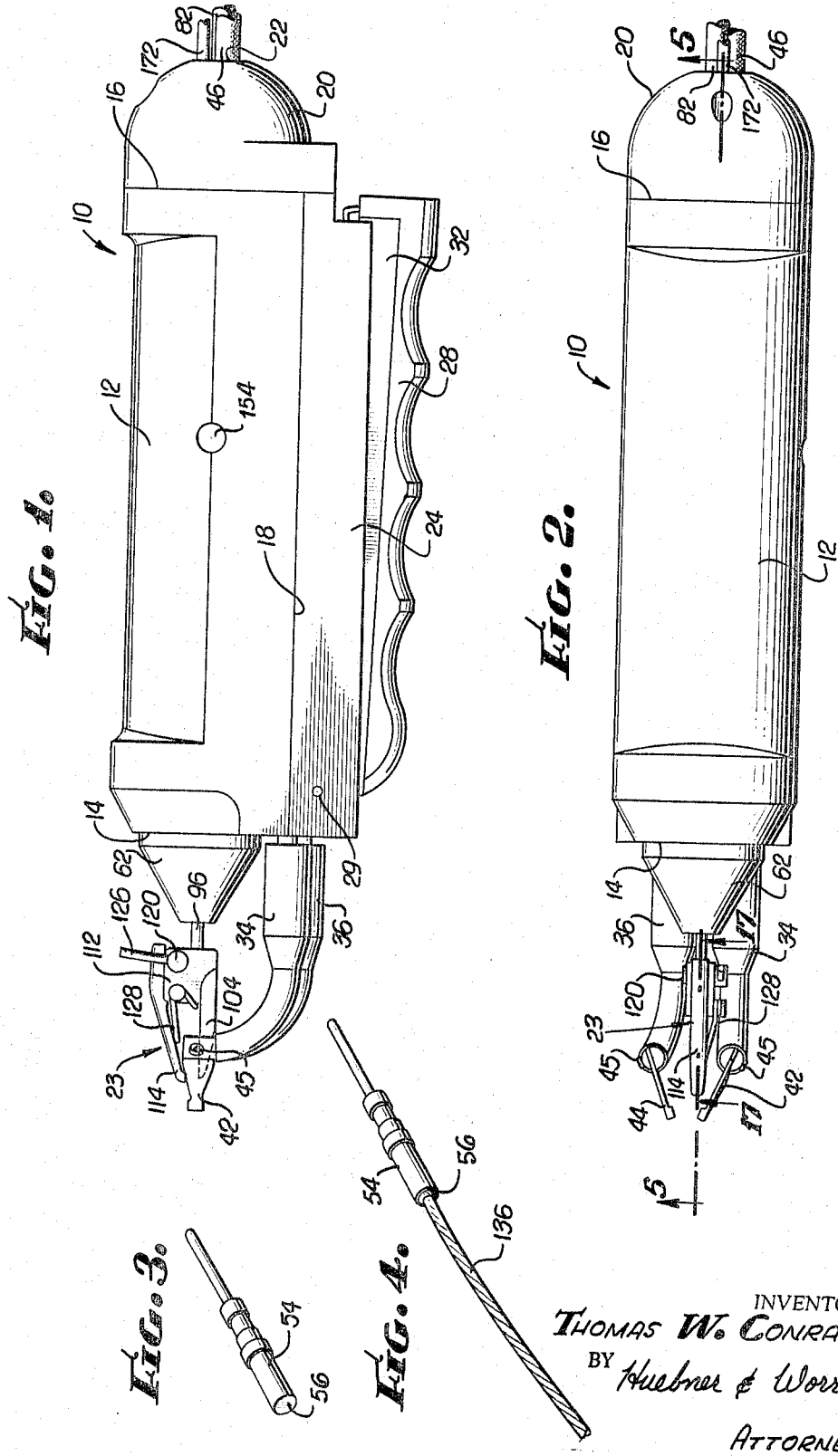

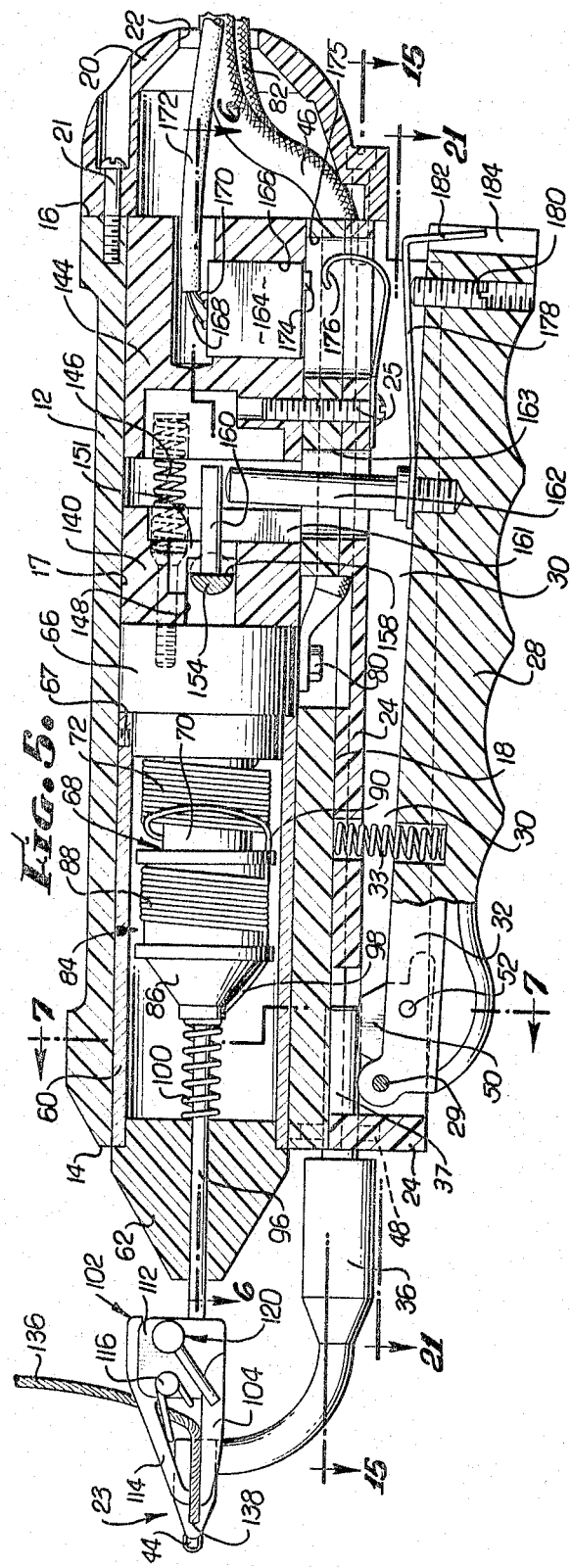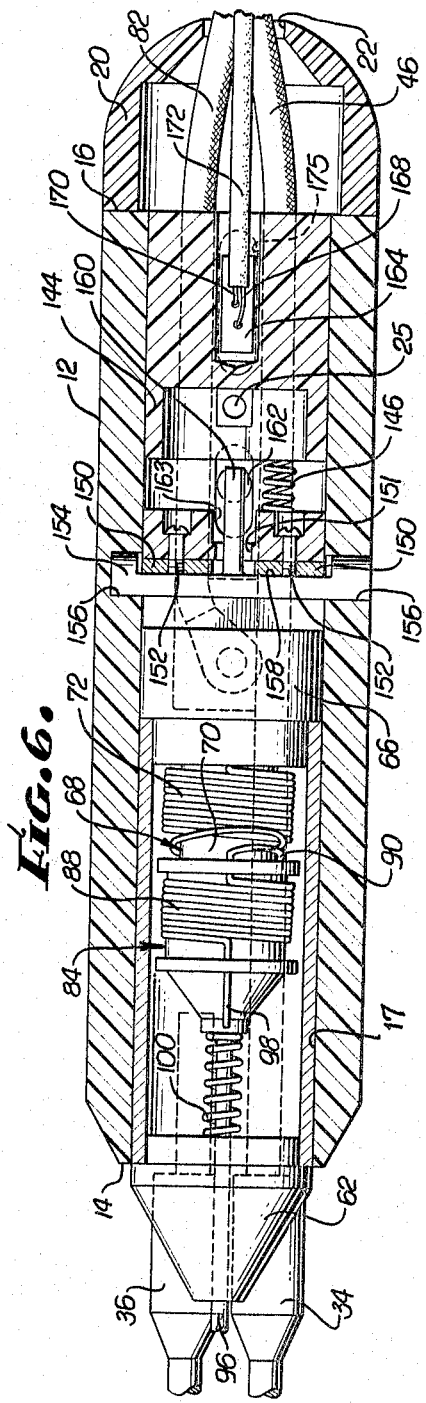
INVENTOR.
*Thomas W. Conrad*
BY *Huebner & Worrel*
ATTORNEYS.

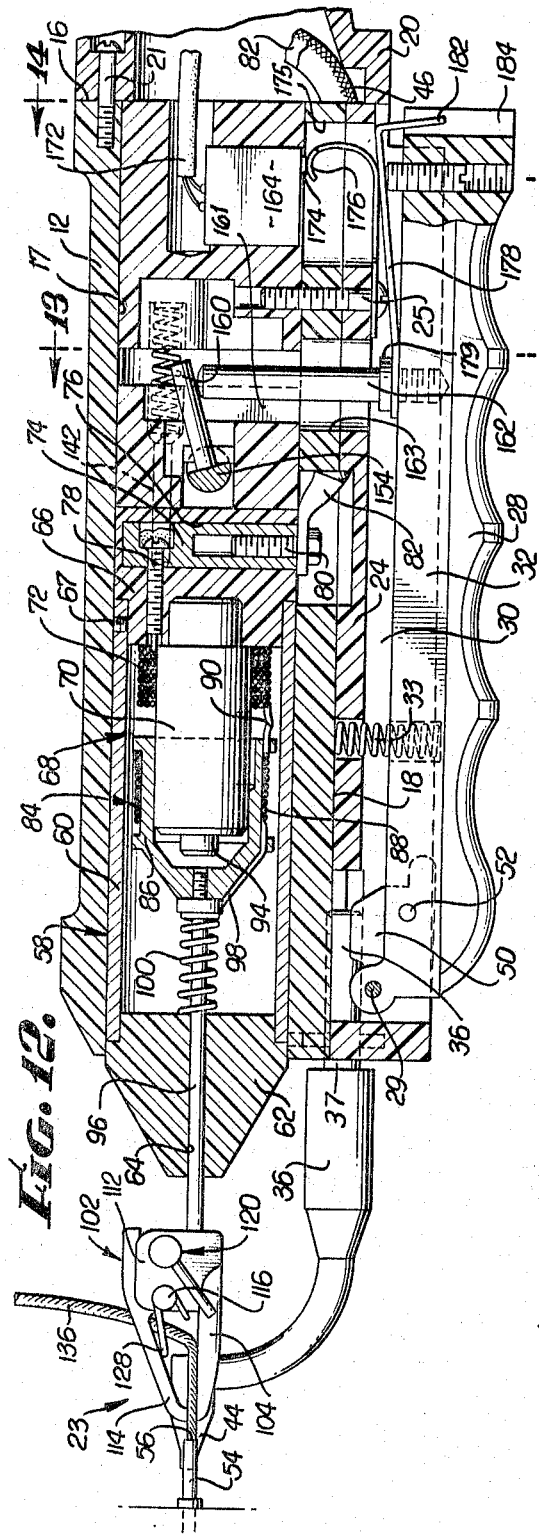
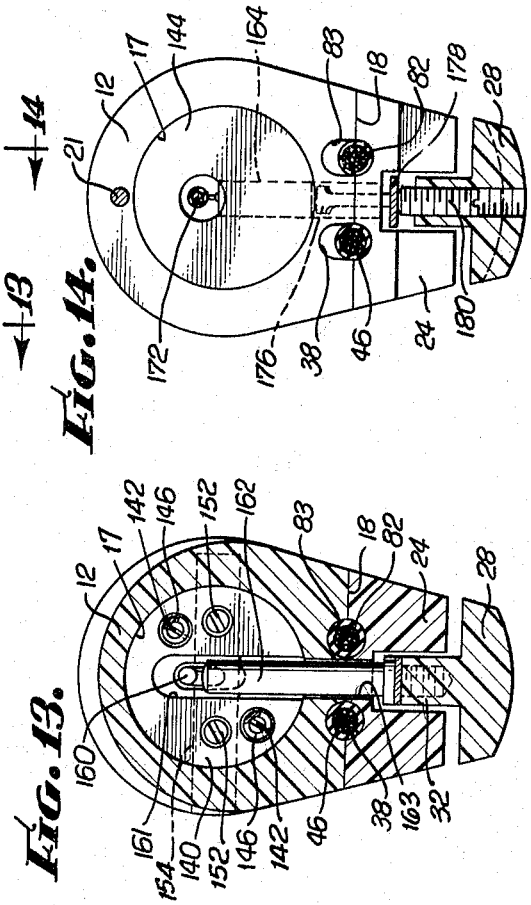

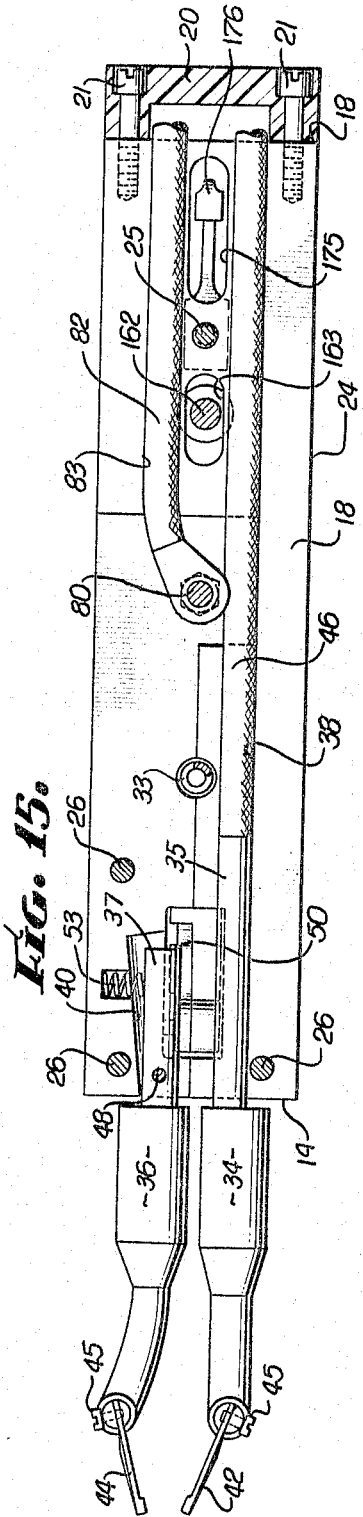
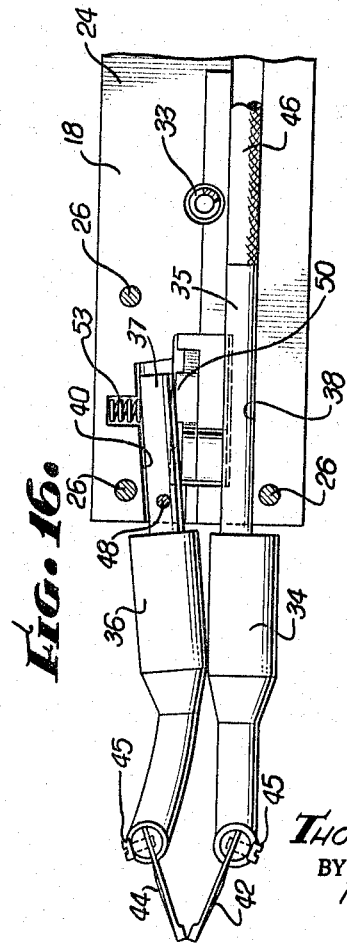
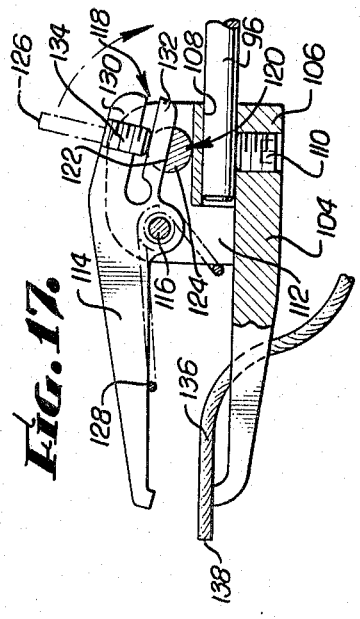
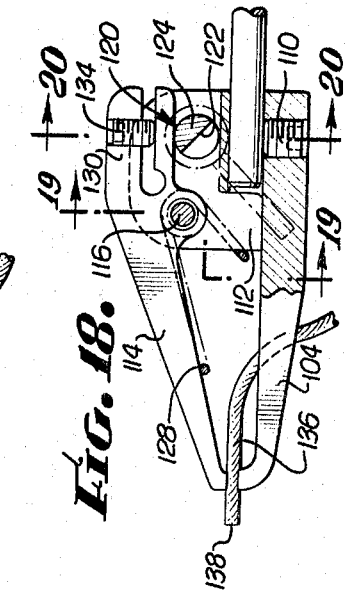
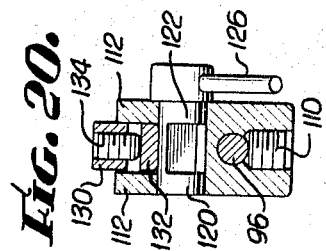
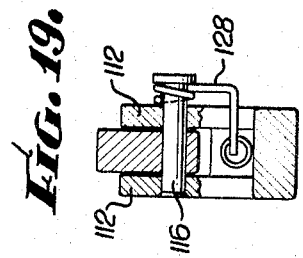
INVENTOR.
*Thomas W. Conrad*
BY
*Huebner & Worrel*
ATTORNEYS.

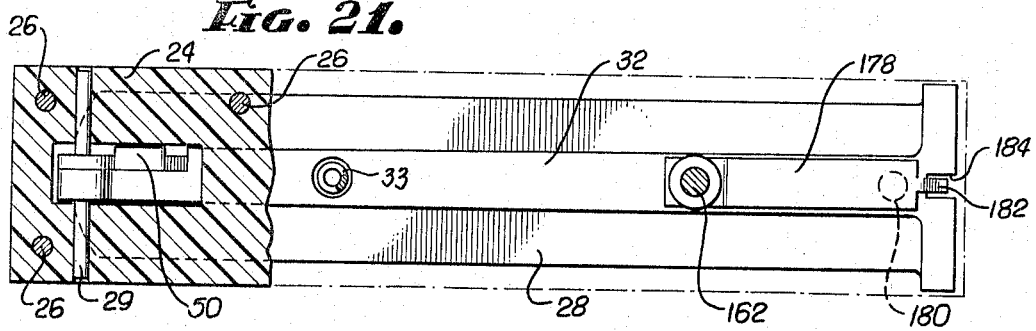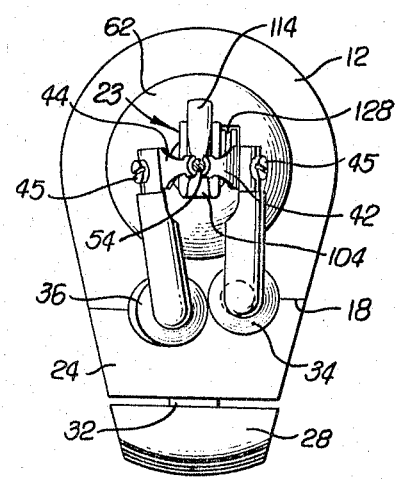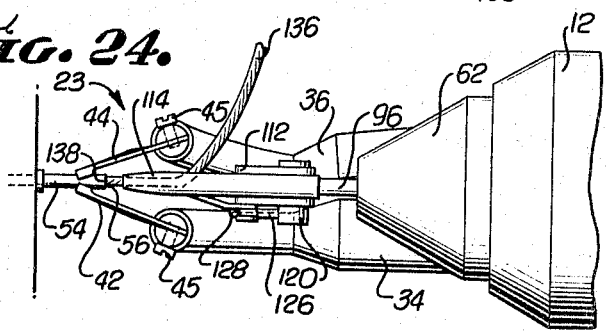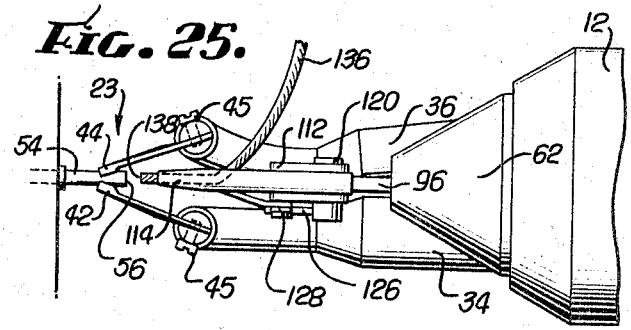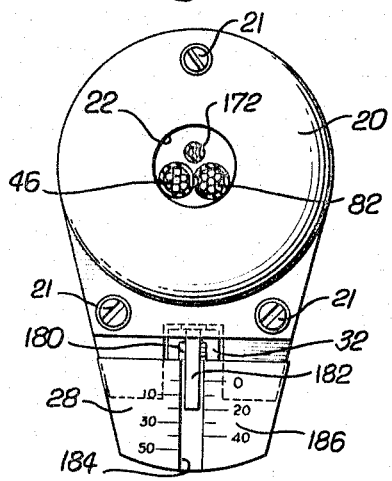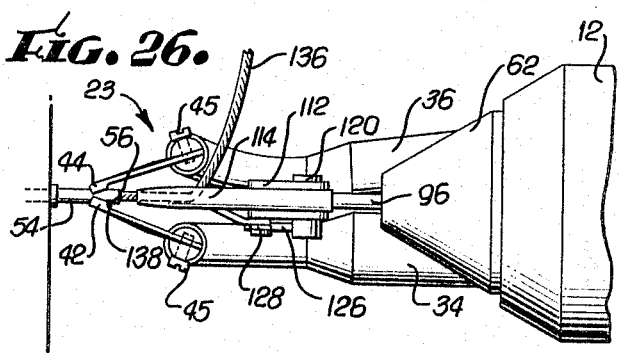

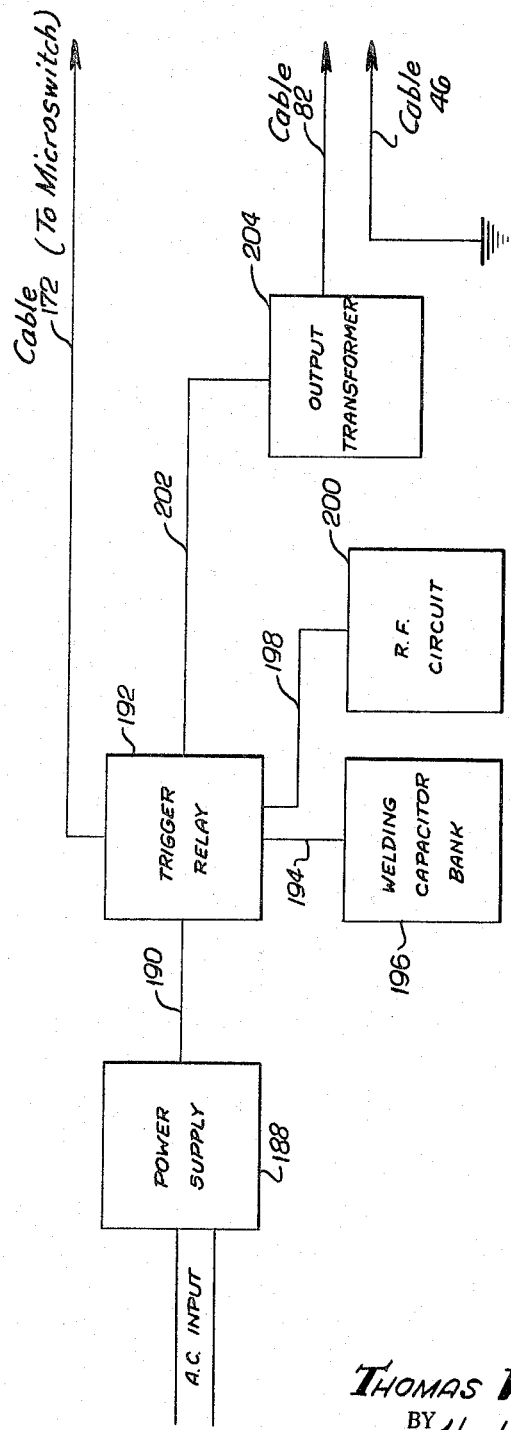

United States Patent Office 3,325,621
Patented June 13, 1967

3,325,621
ARC-PERCUSSIVE WELDING APPARATUS
Thomas W. Conrad, Altadena, Calif., assignor, by mesne assignments, to The Sippican Corporation, Marion, Mass., a corporation of Massachusetts
Filed Apr. 13, 1964, Ser. No. 359,025
15 Claims. (Cl. 219—95)

ABSTRACT OF THE DISCLOSURE

The present invention relates to an arc-percussive welding apparatus comprising a body having two supports for supporting a pair of welding electrodes capable of being moved between spaced and abutting positions, and including welding current delivery means within the body having a switch for releasing welding current to the electrodes, solenoid driving means connected to one of the supports, a cam actuating member mounted on the body and connected to one of the supports for causing relative movement therebetween and for simultaneously actuating both the switch and driving means for delivering welding current and causing percussive engagement of the electrodes.

---

The present invention relates to arc welding apparatus, and particularly to apparatus for arc-percussive welding, wherein the welding electrodes or weldmembers are driven together so that their adjacent surfaces which have been melted by the arc are forged together for an improved weld connection.

Prior art arc-percussive welding was usually accomplished by apparatus wherein the electrodes were initially spaced too far apart to draw an arc, and the welding voltage was applied to the electrodes with such spacing. Then the electrodes were driven together, either by gravity or by spring force, and as they approached each other, they would at some point become close enough so that an arc would be drawn with the available voltage, and the electrodes would continue moving together with the arc heating up the approaching surfaces until impact occurred. In another type of prior art arc-percussive welding apparatus the weldmembers were moved together manually until they were close enough to draw an arc, and then electromagnetic means assisted in driving the electrodes together.

However, such prior art arc-percussive welding apparatus had several disadvantages, particularly where very small welds were being effected. One difficulty was that it was virtually impossible with such prior art apparatus to provide a positive, predetermined spacing between the electrodes before firing of the arc. This usually resulted in both improper heating of the electrodes and an incorrect amount of percussion, with a resulting inferior weld.

Another problem in connection with prior art arc-percussive welding apparatus was that it was usually relatively large and cumbersome, and could not be employed in small spaces. This made such apparatus generally inadequate for providing welds in electrical circuitry.

One type of weld which has been particularly difficult is the welding of an end of a relatively small wire, and particularly a stranded wire, to another member, such as to a contact terminal member for an electrical connector. Not only are these weldmembers difficult to support in proper alignment for making the weld, but in this case the electrode spacing is even more difficult to establish than in many other situations.

In view of these and other problems in the art, it is an object of the present invention to provide arc-percussive welding apparatus having means thereon for quickly removably mounting the electrodes or weldmembers thereon, and which embodies actuating means that automatically establishes a predetermined spacing between the weldmembers or electrodes immediately prior to firing of the arc between the electrodes. In this connection it is an object to provide apparatus wherein such predetermined spacing will be substantially uniform for a plurality of successive welding operations, and it is also an object to provide for adjustment of this predetermined spacing.

Another object of the invention is to provide arc-percussive welding apparatus of the general character described having actuating means which first mechanically provides an accurately predetermined spacing between the electrodes, and then, when said spacing is established, electrically actuates means for substantially simultaneously discharging an arc between the electrodes and driving the electrodes toward each other to cause a percussive or forging blow.

A further object of the invention is to provide arc-percussive welding apparatus of the character described which is readily adaptable either to a bench type tool or to a relatively small hand welding tool suitable for use in relatively confined spaces.

A still further object of the invention is to provide arc-percussive welding apparatus which is capable of welding together very small members, and which has particular utility in welding a wire end, and even an end of a small stranded wire, to another weldmember such as a contact terminal member for an electrical connector, and is capable of welding such members together in axially aligned, end-to-end relationship.

Further objects and advantages of the present invention will appear during the course of the following part of the specification, wherein the details of construction and mode of operation of a presently preferred embodiment are described with reference to the accompanying drawings, in which:

FIGURE 1 is a side elevation illustrating a hand welding apparatus or tool embodying the present invention.

FIGURE 2 is a top plan view of the apparatus shown in FIGURE 1, showing the electrode support means in its relaxed or open position.

FIGURE 3 is a perspective view showing a contact terminal member having a flat rear or termination end surface, the present invention being suitable for welding a wire end to this surface of the terminal member.

FIGURE 4 is a perspective view illustrating the contact terminal member of FIGURE 3 having an end of a twisted, stranded wire welded to its rear end surface by means of the present invention.

FIGURE 5 is a longitudinal vertical section, with portions shown in elevation, taken on the line 5—5 in FIGURE 2, illustrating some of the internal details of construction of the invention, with the various parts in their unactuated positions, but with the wire in its holder preparatory to commencement of a welding operation.

FIGURE 6 is a longitudinal horizontal section, with portions in elevation, taken on the line 6—6 in FIGURE 5.

FIGURE 7 is a transverse vertical section taken on the line 7—7 in FIGURE 5.

FIGURE 8 is a longitudinal vertical section, with portions in elevation, generally similar to FIGURE 5, but with the actuating lever shifted toward the body of the device in a partially actuated position, wherein it has closed the contact gripping fingers about the contact terminal member to support the terminal member in alignment with the wire, and wherein this movement of the actuating member has cammed the actuator, including the wire holder, rearwardly so as to develop a predetermined spacing between the flat, opposed ends of the wire and the contact terminal member.

FIGURE 9 is a transverse vertical section taken on the line 9—9 in FIGURE 8.

FIGURE 10 is a transverse vertical section taken on the line 10—10 in FIGURE 8.

FIGURE 11 is a transverse vertical section taken on the line 11—11 in FIGURE 8.

FIGURE 12 is a longitudinal, vertical section similar to FIGURES 5 and 8, but with the actuating lever moved further toward the body of the apparatus to its completely closed position, wherein it has actuated the microswitch so as to release the welding current, which has caused the actuator to drive the wire holder and its contained wire into percussive engagement with the contact terminal member during discharge of the current between the wire and terminal member.

FIGURE 13 is a transverse vertical section taken on the line 13—13 in FIGURE 12.

FIGURE 14 is a transverse vertical section taken on the line 14—14 in FIGURE 12.

FIGURE 15 is a longitudinal horizontal section taken on the line 15—15 in FIGURE 5.

FIGURE 16 is a fragmentary, longitudinal horizontal section taken on the line 16—16 in FIGURE 8; FIGURES 15 and 16 being taken at substantially the same sectional position in FIGURES 5 and 8, respectively, and particularly illustrating the structure and operation involved in moving the terminal gripping fingers from the open position of FIGURE 15 to the closed position of FIGURE 16.

FIGURE 17 is a fragmentary, axial vertical section taken on the line 17—17 in FIGURE 2, illustrating details of the wire holder, with the holder shown in its open position.

FIGURE 18 is a view similar to FIGURE 17, but with the wire holder in its closed position gripping a stranded wire preparatory to application of the weld.

FIGURE 19 is a transverse vertical section taken on the line 19—19 in FIGURE 18.

FIGURE 20 is a transverse vertical section taken on the line 20—20 in FIGURE 18.

FIGURE 21 is a longitudinal horizontal section taken on the line 21—21 in FIGURE 5, particularly illustrating the mounting of the actuating lever in the base portion of the device, and the mounting of the cam on the lever for moving the terminal gripping fingers together.

FIGURE 22 is a front end elevational view of the welding accessory.

FIGURE 23 is a rear end elevational view of the device.

FIGURES 24, 25 and 26 are top plan views of the forward part of the welding accessory, illustrating the positions of the electrodes (wire and contact terminal) at various points in the cycle of operation of the device, FIGURE 24 showing the wire and terminal engaged in abutting relationship before retraction of the actuator, with the parts of the device positioned generally as shown in FIGURE 5; FIGURE 25 showing the electrodes spaced the predetermined distance established by retraction of the actuator and just prior to the welding current discharge, the parts of the device being in the positions shown in FIGURE 8; and FIGURE 26 showing the device after the welding current discharge has occurred and the electrodes have been impacted together, the parts of the device being generally in their positions as shown in FIGURE 12.

FIGURE 27 is a block diagram illustrating one type of circuit arrangement which may be employed in connection with the present invention for providing the welding current.

Referring to the drawings, and at first particularly to FIGURES 1, 2, 22 and 23 which show the external configuration of the apparatus, the welding apparatus includes a housing generally designated by the reference numeral 10 having an elongated barrel 12 with front and rear ends 14 and 16, respectively, and having a cylindrical bore 17 extending longitudinally therethrough. Barrel 12 has a generally flat bottom side 18. An end bell 20 covers the rear end of barrel 12 and is attached to the barrel by screws 21. End bell 20 has a central rear opening 22, best shown in FIGURES 5, 6 and 23, through which the operating cables of the device extend.

Positioned in front of the barrel is electrode holding structure generally designated 23 for supporting both of the electrodes to be welded together, the structure and operation of each component of the electrode holding structure 23 being described in detail hereinafter.

Positioned against the generally flat bottom side 18 of the barrel is a lever mounting base 24 which is attached to the barrel by means of a screw 25 (shown in FIGURES 15, 16 and 21).

Pivotally mounted in mounting base 24 is an actuating lever 28, which is mounted on pivot pin 29 extending transversely and horizontally through base 24 near its front end. The pivotal mounting and positioning of actuating lever 28 with respect to base 24 is illustrated in FIGURES 1, 5, 7 to 14, and 21 to 23. The base 24 has a longitudinal, downwardly opening slot 30 extending from a position close to the front end of the base all of the way through the rear end of the base. The lever 28 has an upwardly directed, longitudinally extending tongue 32 extending from a position close to its rear end all of the way to its forward end, the tongue being movable within the slot 30. A spring 33 is engaged between the actuating lever 28 and the bottom 18 of the barrel, extending through a suitable opening in base 24, for biasing the lever to its unactuated or open position as best shown in FIGURES 1 and 5.

The portion of electrode holding structure 23 which supports the electrode that is held stationary (which in this case is the contact terminal member) when the arc-percussion spacing is developed prior to discharge of the arc, will now be described. This structure includes a fixed support arm 34 which is secured to a fixed mounting stud 35, and a movable support arm 36 which is secured to a pivoted mounting stud 37. The mounting studs 35 and 37 extend into generally longitudinally arranged, forwardly opening bores 38 and 40, respectively, which are partly in the bottom of barrel 12 and partly in the base 24.

The support arms 34 and 36 extend forwardly and curve upwardly at their forward ends, terminating with respective gripping fingers 42 and 44 which are attached to the forward, upper ends of the respective support arms by any suitable means, such as by screws 45 as best shown in FIGURES 15, 16, 22, and 24 to 26, to permit removal of the gripping fingers for replacement or cleaning. The gripping fingers 42 and 44 are axially aligned with the center of the cylindrical bore 17 extending longitudinally through the barrel 12.

The bore 38 within which the fixed stud 35 is mounted extends through the entire length of barrel 12 and base 24, and welding current cable 46 is connected to stud 35, as by soldering, crimping or otherwise, and extends rearwardly through bore 38 and thence out of the accessory through the rear opening 22 in end bell 20.

The pivoted stud 37 is pivotally supported on a vertical pivot pin 48 as best shown in FIGURES 15 and 16, and the bore 40 is provided with sufficient clearance to permit pivotal movement of stud 37 about pin 48 which will move the gripping finger 44 from an open position substantially spaced from finger 42 as shown in FIGURES 2 and 15 to a closed position proximate finger 42 as shown in FIGURES 16, 22, and 24 to 26. A spring 53 is seated in a suitable recess in barrel 12 and base 24 and is engaged against stud 37 to the rear of pivot pin 48 so as to bias the movable gripping finger 44 toward its open position as shown in FIGURES 2 and 15.

A cam member 50 is attached to actuating lever 28 by a suitable pin 52, and is also supported by the lever pivot pin 29. When the welding apparatus is unactuated, with the lever 28 in its lowermost or open position as shown in FIGURE 5, the pivoted mounting stud 37 is unmoved by cam member 50, and is held by spring 53 so that gripping finger 44 is in its open position. The relationship of cam member 50 to pivoted stud 37 in this position is best shown in FIGURES 7 and 15. When the actuating lever 28 is moved from its fully open position of FIGURE 5 toward its partially closed position of FIGURE 8, the first event caused by this movement is pivoting of stud 37 to close the gripping fingers, this action being caused by the cam member 50 as best illustrated in FIGURES 11 and 16.

Although it is to be understood that the present invention can be employed for welding together any desired pair of electrode members, as stated above the invention has particularly utility in welding together such small and difficult items as a stranded wire to a contact terminal member, the two members being welded end-to-end in axial alignment. Accordingly, the weld member illustrated in the drawings which is gripped between the gripping fingers 42 and 44 is a contact terminal 54 having a flat rear termination end 56 in a plane normal to the axis of the terminal. The terminal 54 is gripped between fingers 42 and 44 so as to be generally axially aligned with the central axis of the cylindrical bore 17 of the barrel.

The actuator 58 employed in setting the predetermined arc gap between the electrodes and for driving one of the electrodes (the wire) toward the other for the forging blow, will now be described.

Actuator 58 is mounted within the cylindrical bore 17 of barrel 12, and includes a tubular shell 60 that is longitudinally slideable as a plunger in the barrel bore. Supported in the front end of shell 60 is a nose piece 62 which acts as a bearing, having a bore 64 therethrough that is coaxial with the bore 17 of the barrel. The nose piece 62 extends forwardly of the shell 60 and out of the front end of the barrel bore, and is preferably tapered in a generally frusto-conical shape.

A rear end plug 66 is supported in the rear end of shell 60, and is secured by a plurality of locking screws 67. A repulsion solenoid is disposed within the actuator shell 60, and is generally designated 68. The repulsion solenoid includes a stator core 70 supported by and extending forwardly from the rear end plug 66 as best shown in FIGURE 12. A fixed coil 72 is disposed about the rear portion of core 70, one wire lead from coil 72 being connected to a generally vertically arranged conductive sleeve terminal 74 which is disposed in a downwardly opening bore 76 in rear end plug 66. The wire lead from coil 72 extends through a central passage in a screw 78 which passes through an opening in terminal 74, and for improved electrical connection solder may be flowed into the connection between screw 78 and sleeve 74. A terminal screw 80 is engaged in a downwardly opening threaded bore in sleeve 74, and electrically and mechanically connects the end of the other welding current cable 82 to the terminal sleeve 74. Cable 82 extends rearwardly through a longitudinal passage 83 which is parallel to the rear portion of passage 38 and extends between barrel 12 and base 24, the cable 82 extending rearwardly through end bell 20 and out its opening 22.

Referring again to the details of construction of the actuator 58, there is a movable coil assembly in the shell 60 forward of the fixed coil 72. This movable coil assembly includes a cup-shaped bobbin 86 axially slideable over core 70 and having movable coil 88 thereon which is electrically connected to coil 72 through flexible jumper wire 90. Coils 72 and 88 are wound for repulsion, so that when current passes through the two coils the bobbin will be repulsed forwardly with respect to the stator core 70. Bobbin 86 is keyed against rotation on core 70 by a key 92 supported in the bobbin and slideable in a suitable longitudinal slot in core 70. Proper axial positioning of bobbin 86 relative to core 70 in the unactuated position of the device is established by a non-magnetic spacer member 94 projecting forwardly from core 70 to engage the bobbin.

An elongated plunger 96 is fixedly mounted on the front of bobbin 86 and extends coaxially forwardly from the bobbin through the bore 64 in the nose piece or bearing 62 and is slideable in bore 64. The coil 88 is electrically connected by a wire 98 to the plunger 96. A return spring 100 is disposed about plunger 98 and is engaged between nose piece 62 and bobbin 86 to bias the entire movable coil assembly rearwardly to a position of repose defined by engagement of the bobbin against the spacer 94.

Mounted on the external, forward end of plunger 96 is wire holder 102, which forms a portion of electrode holding structure 23.

The wire holder 102 is shown in detail in FIGURES 17 to 20, and includes a fixed jaw 104 having a rearward base portion 106 with a longitudinally extending bore 108 therein. Bore 108 is adapted to receive the forward end of actuator plunger 96, and the fixed jaw is rigidly secured to the forward end of the plunger by a set or lock screw 110.

A pair of spaced ears extend upwardly from the base 106 of the fixed jaw, and a pivoted jaw 114 is pivotally mounted between ears 112 on a pivot pin 116 which extends transversely through suitable openings in the ears. The pivoted jaw has an extension generally designated 118 to the rear of pin 116 which is engaged by a cam pin 120 flattened at 122 to provide a cam lobe 124, the cam pin 120 having an operating lever 126 to one side of the jaws. A spring 128 is engaged between the jaws so as to bias the jaws apart, whereby the rearward extension 118 of the pivoted jaw is biased against the cam pin 120. The jaws are open as shown in FIGURE 17 when the cam is positioned so that its flat surface 122 engages the rearward extension of the movable jaw. When the cam lever is turned, the lobe 124 pivots the jaw 114 from the open position of FIGURE 17 to the closed position of FIGURE 18 wherein the wire electrode is gripped between the forward tips of the jaws.

The rearward extension 118 on the pivoted jaw is slotted to provide a generally rigid external or upper leg 130 and a bendable internal or lower leg 132, and an adjusting screw 134 is threadedly engaged through the generally rigid leg 130. By proper adjustment of screw 134 the amount of holding force of the jaws on the wire electrode may be controlled.

Although any other type of electrode may be gripped by the holder 102, the specific holder shown and described is particularly adapted for gripping and holding a small wire, such as a twisted, stranded wire 136 as shown in the drawings. The forward gripping end of at least one of the jaws, in this instance the pivoted jaw 114, is longitudinally notched for securely holding an end portion of the wire substantially in axial alignment with the actuator plunger 96. The wire is prepared with a flat, forwardly facing end 138 having its flat surface plane at right angles with respect to the axis of plunger 96, and when the wire is thus gripped between the jaws it will be axially aligned with a contact terminal member 54 when the latter is held between the gripping fingers 42 and 44, as best shown in FIGURES 8, 12, 22, and 24 to 26.

The cam means will now be described for moving the actuator 58 rearwardly in the barrel bore from the position shown in FIGURE 5 to the position shown in FIGURE 8 to provide the predetermined gap between the electrodes. It includes an actuator cam housing 140 which is a generally cylindrical member having substantially the same diameter as the actuator shell 60, housing 140 being secured to the actuator end plug by screws 142 so as to move in the barrel as a part of the actuator.

Mounted in the rear end portion of the barrel bore is an actuator switch housing 144, which is fixedly positioned within the barrel by engagement of the screw 25 therein. Space is provided in the barrel between the cam housing 140 and the switch housing 144, and a pair of springs 146 are engaged in suitable recesses in housings 140 and 144 so as to bias cam housing 140, and hence the entire actuator 58, forwardly in the barrel.

A transverse slot 148 extends horizontally through the cam housing 140, and disposed against the rearward side of this slot is a pair of cam follower plates 150 which are generally vertically arranged and spaced on opposite sides of a central opening 151 in housing 140 which extends from slot 148 to the rear end of the cam housing. Plates 150 are secured in position by screws 152 as best shown in FIGURE 6.

The actuator retracting cam 154 is mounted in a transverse bore 156 in the barrel and extends through slot 148 in the cam housing, as is best shown in FIGURE 6. Cam 154 has a flat, generally rearwardly facing cam surface 158 against which the plates 150 will normally be seated by the force of springs 146 to positively determine the forwardmost position of the actuator 58 in the barrel. A cam lever 160 is integrally connected to cam 154 proximate the center of the cam as best shown in FIGURE 6, and extends rearwardly through the central opening 151 of the cam housing and through a vertical recess 161 at the rear of the cam housing and into the space between the cam housing and the switch housing 144.

A cam rod 162 is threadedly mounted on the actuating lever 28 and projects upwardly through an opening 163 in base 24, the upper end of cam rod 162 being adapted to engage cam lever 160. When the actuating lever 28 is in its lowermost or unactuated position as shown in FIGURE 5, the upper end of cam rod 162 will be spaced below the cam lever 160, so that the actuator 58 and wire holder 102 will be in their forwardmost positions defined by engagement of the cam follower plates 150 against the flat cam surface 158.

As the actuating lever 28 is moved upwardly toward a more closed position from its lowermost or open position of FIGURE 5, the upper end of cam rod 162 will approach cam lever 160 during the interval that the cam member 50 causes the movable gripping finger 44 to move from the open position of FIGURE 15 to the closed position of FIGURE 16. Continued upward movement of the actuating lever 28 toward a more closed position will cause cam rod 162 to move cam lever 160 upwardly, whereby the lower edge of the flat cam surface 158 will move the cam follower plates 150 and hence the entire actuator 58, including the wire holder 102, and also the wire 136 gripped thereby, rearwardly. This rearward camming of the actuator 58, and hence of the wire 136, will continue until the instant the microswitch 164 mounted in switch housing 144 is actuated to cause discharge of the welding arc as hereinafter described.

The microswitch 164 is mounted in a downwardly opening recess 166 in switch housing 144. Wires 168 and 170 are connected to microswitch 164, and extend in a cable 172 rearwardly and out of the device through opening 22 in end bell 20. Microswitch 164 is a normally open switch, and may be closed by depression of a small actuator button 174 on the bottom thereof, actuator button 174 being accessible through an opening 175 in the base part 24 of the housing.

Switch trip spring 176 is anchored in the slot 30 of base 24 by means of the screw 25, and extends rearwardly from screw 25 and turns upwardly into the opening 175 in the base. Trip spring 176 in its position of repose as shown in FIGURE 5 is spaced substantially below the microswitch actuator button 174.

The trip spring 176 is adapted to be engaged and moved toward the button 174 by a calibrating spring 178 which is secured to the tongue 32 of lever 28 by a collar 179 on the lower part of cam rod 162. Calibrating spring 178 tends to extend rearwardly flat against the tongue 32, but is bent upwardly from the tongue and is adjustable with respect to the tongue by means of an adjusting screw 180 in the tongue. Screw 180 is accessible from below the actuating lever 28. Calibrating spring 178 has a downturned end leg portion 182 which is movable in a vertical slot 184 at the rear end of actuating lever 28, the lower edge of leg 182 being disposed adjacent to a calibration scale 186 on the rear end surface of the actuating lever as best shown in FIGURE 23.

Adjustment of screw 180 will vary the position of calibrating spring 178 with respect to the trip spring 176 and with respect to the microswitch actuator button 174, so that adjustment of screw 180 will vary the amount of movement of lever 28 required to actuate the microswitch. This will, in turn, cause a variation in the amount of retraction movement applied to actuator 58 by the retracting cam 154 before the microswitch is tripped to cause release of the welding current. Accordingly, if desired the calibration scale 186 may be arranged to show the electrode spacing at the time the switch is actuated to release the welding current.

Referring now to FIGURE 27, this figure is a block diagram illustrating one type of circuit arrangement which may be employed with the welding apparatus which embodies the present invention. It is to be understood, however, that the invention is not limited to the particular circuit arrangement disclosed herein, and that any of a number of available circuit arrangements may be employed in connection with the present invention for providing the welding current.

The circuit arrangement shown in FIGURE 27 includes a power supply 188 having A.C. input means, and being connected by suitable circuit means 190 to a trigger relay 192. The power supply furnishes relatively low voltage power to the trigger relay for actuating the relay, and furnishes relatively high voltage D.C. power to the trigger relay for the purpose of charging the capacitors which will discharge for providing the welding current to the electrodes.

Connected to the trigger relay 192 by suitable circuit means 194 is welding capacitor bank 196. Also connected by suitable circuit means 198 to trigger relay 192 is an R.F. circuit 200.

Output of the circuit arrangement shown in FIGURE 27 is from trigger relay 192 through circuit means 202 and through output transformer 204 to the cables 46 and 82, one of which will normally be grounded.

The trigger relay 192 is connected to cable 172 which includes the two wires 168 and 170 that are connected to microswitch 164 in the welding accessory. Trigger relay 192 is normally unactuated, but is adapted to be actuated by the closing of microswitch 164. In the unactuated position of trigger relay 192, it connects power supply 188 to both the welding capacitor bank 196 and to the R.F. circuit 200 for charging the capacitor bank 196 and for charging capacitors in the R.F. circuit. In this unactuated position of trigger relay 192 the power supply 188, welding capacitor bank 196 and R.F. circuit 200 are all electrically disconnected from the output transformer 204, whereby welding current is not provided to the electrodes of the welding accessory.

However, upon the closing of microswitch 164 the trigger relay 192 is actuated. In its actuated position, the relay 192 connects both the R.F. circuit 200 and the welding capacitor bank 196 to the output transformer 204. The R.F. circuit is designed to instantaneously apply a high voltage R.F. electrical potential across the electrodes through the cables 46 and 82 for ionizing the gap between the electrodes and thus initiating the welding arc. When the arc has thus been initiated the welding capacitor bank 196 will immediately discharge a relatively low voltage, high amperage current through the ionized gap between the electrodes, this current passing through the cables 46 and 82.

When the microswitch 164 is again opened, the trigger relay returns to its unactuated position first described for recharging the welding capacitor bank 196 and the capacitors in the R.F. circuit 200.

Although the operation of the welding apparatus has to a large extent been described in connection with the structural descriptions of the various individual parts, the following is a summary of the operation of the welding apparatus as a whole:

To prepare the apparatus for operation the power supply 188 of FIGURE 27 is turned on. At this time the trigger relay 192 is in its unactuated position, since microswitch 164 is open, so that no welding current is provided to the cables 46 and 82. However, in this unactuated position of trigger relay 192, the welding capacitor bank 196 and the capacitors in R.F. circuit 200 will be charged, ready for initiating and discharging the welding current.

The welding apparatus is grasped in the hand, with the barrel 12 generally in the palm of the hand and the fingers engaged around actuating lever 28. Initially the apparatus will be in the position shown in FIGURE 5, with the lever 28 fully extended, so that the microswitch 164 is unactuated. In this position the actuator retracting cam 154 is also unactuated so that the actuator 58 is in its forwardmost position. The gripping fingers 42 and 44 are separated at this time as best shown in FIGURES 2 and 15, the pivoted mounting stud 37 not having been pivotally moved as yet by the cam member 50 that is attached to the lever near its pivot.

With the apparatus in this condition the wire electrode 136 is engaged between and gripped by the jaws 104 and 114 of holder 102 by manipulation of the cam lever 126. The wire is set in the holder so that its flat end 138 projects forwardly from the jaws 104 and 114, and the end portion of the wire proximate end 138 is generally coaxial with the actuator plunger 96.

Next, the other electrode, in this case the contact terminal 54, is grasped in the other hand and is positioned between the gripping fingers 42 and 44, and the actuating lever 28 is pivoted upwardly so that cam member 50 pivots the mounting stud 37 from its position of FIGURE 15 to its position of FIGURE 16, closing the gripping fingers 42 and 44 into engagement with the terminal 54. During this closing of gripping fingers 42 and 44 the terminal 54 is held axially aligned with the end portion of the wire and with its flat end 56 in abutment with the flat end 138 of the wire, whereby the relative positioning of the wire 136 and terminal 54 is initially established. At this time the wire 136 and terminal 54 will be positioned as shown in FIGURE 24.

Continued upward pivoting of lever 28 will then result in engagement of actuator cam lever 160 by cam rod 162 so as to pivot the actuator retracting cam 154 and cause retraction of the entire actuator assembly including actuator 58, wire holder 102 and actuator cam housing 140, against the biasing force of springs 146. In other words, the actuator assembly is moved to the right as seen in FIGURES 5 and 8 from its position of FIGURE 5 to its position of FIGURE 8. This retraction of the actuator continues so long as the microswitch 164 remains unactuated, and it is the amount of movement of actuator retracting cam 154 which can occur before the microswitch is actuated that determines the amount of spacing which will develop between the electrodes before the welding current is released. FIGURES 8 and 25 show the positions of the parts immediately before the microswitch actuator button 174 is engaged by the trip spring 176 to cause the welding current discharge, so that the spacing shown in FIGURES 8 and 25 corresponds to the predetermined arc gap according to the adjustment of the device. This predetermined gap can be varied by adjustment of the adjusting screw 180.

When the trip spring 176 is moved into contact with the microswitch button 174 by further upward movement of lever 28, the trigger relay 192 is actuated by closing of the microswitch, which instantaneously applies the R.F. initiating potential and releases the welding curent across the electrode gap by connecting R.F. circuit 200 and welding capacitor bank 196 to the cables 46 and 82. The welding current simultaneously establishes the arc and passes through the repulsion solenoid coils 72 and 88, so that the instant the arc is fired between the electrodes the bobbin 86 and plunger 96 will be driven forwardly so as to drive the flat end 138 of the wire electrode against the flat end 56 of the terminal electrode in a percussive forging blow. The welding current discharge quickly reaches a high amperage peak when it is applied, and this, coupled with the fact that a repulsion solenoid of the type shown and described herein has its greatest actuating force in its initial increments of movement, results in the percussive movement occurring very rapidly so that the electrode surfaces will be driven together while they are molten from the hot arc discharge. FIGURES 12 and 26 illustrate the positions of the parts when the electrodes have come together in the forging blow.

After the electrodes have come into percussive engagement, further forward movement of the actuator plunger and wire holder will result in slippage of the wire in the wire holder or of the terminal in the gripping fingers 42 and 44, or both. The amount of impact which occurs in the percussive blow can be controlled by the tightness with which the wire and contact terminal are held in their respective gripping means, and hence how easily this slippage will occur.

When the weld has thus been complete, the lever 28 is released so that it will pivot downwardly. This results in opening of the microswitch, which causes trigger relay 192 to again become unactuated, thus re-connecting the power supply 188 to the welding capacitor bank 196 and the R.F. circuit 200 for recharging the capacitors, and disconnecting the cables 46 and 82 from the sources of current. Release of the lever 28 also releases the actuator cam 154 so that the actuator 58 will again move forwardly as a unit, and the final return movement of actuating lever 28 to its unactuated position of FIGURE 5 will result in release of the pivoted mounting stud 37 by cam member 50 so as to separate the gripping fingers 42 and 44 and release the contact terminal 54. The wire is then released from holder 102 and the apparatus is ready to perform another weld.

Although the gripping fingers 42 and 44 illustrated in the drawings are set for performing an axial weld, it is to be understood that by merely changing the fingers, angle welds can be made, as for example welds at angles of from 45 degrees to 90 degrees.

It is also to be understood that although the invention has been shown and described herein as embodied in a hand tool, it is equally adaptable for use in a stationary or bench type tool.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of claims.

I claim:

1. Welding apparatus, comprising an elongated body having a bore therein extending from a front end toward a rear end; first support means disposed at the front end of the body for holding a first electrode; second support means for holding a second electrode; actuating means slidably disposed in said bore for moving an element projecting forwardly from said actuating means and including solenoid means, said second support means adapted to cooperate with said element for movement therewith, said actuating means causing said first and second electrodes to be in an abutting relationship prior to being activated; welding current delivery means disposed within said body, comprising a plurality of cables, one of said cables electrically connected to said first support means, and another cable being electrically connected through said solenoid means to said second support means, electrical switch means disposed within said body for releasing welding current through said cables; an actuating member movably secured to said body; cam means for causing said actuating member to cooperate with said actuating means upon movement of said actuating member in a predetermined manner, the movement of said actuating member causing the actuating means to move rearwardly within said bore; switch operating means cooperating with said actuating member for operating said electrical switch means after the rearward movement of said actuating means, the operating of said electrical switch means causing welding current to establish a welding arc between said electrodes and to actuate said solenoid means; means for supplying power from an external power source, comprising means for supplying power to a plurality of capacitors; means for supplying power to a circuit control relay; means cooperating with said control relay for initiating a welding arc between said first and second electrodes; and means for causing electrical current to flow between said electrodes.

2. Welding apparatus as defined in claim 1 wherein said solenoid means comprises a repulsion solenoid.

3. Welding apparatus as defined in claim 1 wherein the rearward movement of said actuating means results in said first electrode and second electrode separating a selected distance.

4. Welding apparatus which comprises a body, a first electrode support structure mounted on the body for supporting a first welding electrode in a substantially stationary position with respect to the body, a second electrode support structure for supporting a second welding electrode, said second support structure being movable between a first position wherein said electrodes are in abutment and a second position wherein said electrodes are spaced a predetermined distance apart, welding current delivery means in the body and connected to said first and second support structures for delivering welding current to the electrodes, said welding current delivery means including an electrical switch in the body operable to release welding current to the electrodes, solenoid driving means in the body connected to said second electrode support structure for driving said second support structure from its said second position to its said first position, said solenoid driving means being electrically connected to said welding curent delivery means so as to be energized by welding current delivered to said electrodes, and an actuating member movably mounted on the body, said actuating member being connected to said second electrode support structure for moving said second support structure from its said first position to its said second position, and said actuating member having means associated therewith for operating said switch when the actuating member has moved said second support structure to its said second position, whereby when the electrodes are supported in abutment in said support structures and said actuating member is moved relative to the body, said second support structure will move from its first to its second position to space said electrodes said predetermined distance apart and will then operate said switch to release welding current to the electrodes, said welding current energizing said solenoid driving means to drive the second support structure from its second position to its first position to cause percussive engagement between the electrodes, said welding current being supplied from a plurality of capacitors, and power supply means for delivering power from said plurality of capacitors to said solenoid means and said electrodes, said power supply means including means for initiating a welding arc between said electrodes.

5. Welding apparatus as defined in claim 4, wherein said solenoid driving means is supported in an actuator unit that is slideably mounted in the body, said solenoid driving means including a movable element that is movable in said actuator unit, said movable element including a portion extending out of said actuator unit and having said second electrode support structure mounted thereon, said connection between said actuating member and said second electrode support structure comprsing cam means engageable between the actuating member and said slideable actuator unit, whereby said actuating member moves said second electrode support structure from its first position to its second position by camming said actuator unit to cause slideable movement thereof in the body, the welding current released by operation of said switch causing movement of said movable element relative to the actuating unit so as to drive the second electrode into percussive engagement with the first elecrode.

6. Welding apparatus as defined in claim 5, which includes spring means in the body engageable with said slideable actuator unit to bias the slideable actuator unit toward a position wherein said second support structure will be in its said first position with the solenoid driving means unenergized.

7. Welding apparatus as defined in claim 5, wherein said means associated with the actuating member for operating the switch is adjustable for adjusting the amount of movement of the actuating member required to operate the switch, thereby adjusting the amount of camming movement imparted by the actuating member to the slideable actuator unit before the switch is operated so as to adjust said predetermined spacing between the electrodes.

8. Welding apparatus as defined in claim 5, wherein said first electrode support structure comprises a pair of gripping members mounted on the body for relative movement between an open position wherein the gripping members are spaced apart and a closed position wherein the gripping members come together to support said first electrode therebetween, and second cam means engageable between said actuating member and at least one of said gripping members to cam said gripping members from said open position to said closed position, whereby said first electrode can be positioned in abutment with the second electrode and the actuating member moved to cam the gripping members together to hold the first electrode in abutment with the second electrode, said first mentioned cam means being inoperative until said second cam means has closed the gripping members into engagement with the first electrode, and said first mentioned cam means then being operative to slide the actuator unit for establishing said predetermined spacing between the electrodes.

9. Welding apparatus accessory as defined in claim 5, wherein said first electrode support structure comprises a pair of gripping members adapted to grip said first electrode therebetween, one of said gripping members being fixedly mounted on the body and the other being movably mounted on the body for movement between an open position wherein the gripping members are spaced apart and a closed position wherein the gripping members come together to support said first electrode therebetween, and second cam means engageable between said actuating member and said movable gripping member to cam said movable gripping member from said open position to said closed position, whereby said first electrode can be positioned in abutment with the second electrode and the actuating member moved to cam the gripping members together to hold the first electrode in abutment with the second electrode, said first mentioned cam means being inoperative until said second cam means has closed the gripping members into engagement wtih the first electrode, and said first cam means then being operative to slide the actuator unit for establishing said predetermined spacing between the electrodes.

10. Welding apparatus accessory as defined in claim 9, which includes spring means engaged between the body and said movable gripping member biasing the latter toward said open position.

11. Welding apparatus accessory which comprises an elongated body having front and rear ends and having a bore therein opening at said front end, a first welding electrode support structure mounted at the forward end of the body and adapted to hold a first electrode in a fixed position in front of the body, an actuator unit slideable in said bore and having a repulsion solenoid therein, said solenoid including a movable element projecting forwardly from the actuator unit and the bore and having second electrode support structure thereon which is adapted to hold a second electrode in abutment with the first electrode, welding current delivery means in the body and including a pair of cables, one cable being electrically connected to said first electrode support structure and the other cable being electrically connected through said solenoid to said second electrode support structure, whereby when welding current is delivered through said cables to the electrodes it will pass through said solenoid to actuate the latter, said welding current delivery means also including an electrical switch in the body and operable to release welding current through said cables, an actuating member movably mounted on the body, cam means engageable between the actuating member and said actuator unit for slideably retracting said actuator unit in the bore so as to move said second electrode support structure away from said first electrode support structure, and switch operating means associated with the actuating member for operating the switch after the actuating member has retracted the actuator unit a predetermined distance within the bore, whereby when the electrodes are supported in abutment in said support structures, movement of said actuating member will first cause retraction of said actuator unit into said bore to separate the electrodes a predetermined distance, and then cause operation of said switch to deliver welding current to establish a welding arc between the spaced electrodes and to actuate said solenoid for driving said second electrode into percussive engagement with said first electrode.

12. Welding apparatus as defined in claim 11, wherein said actuating member comprises a lever pivotally mounted on the body.

13. Welding apparatus as defined in claim 11, wherein the sliding movement of said actuator unit in the bore and the movement of said movable element of the solenoid are directed generally along the same axis, and wherein said electrodes are supported generally in alignment with said axis.

14. Welding apparatus as defined in claim 11, wherein the sliding movement of said actuator unit in the bore and the movement of said movable element of the solenoid are directed generally along the same axis, and wherein said actuator unit is forwardly spring biased relative to the body, and said movable element of the solenoid is rearwardly spring biased with respect to the actuator unit.

15. Welding apparatus as defined in claim 14, wherein said first electrode support structure comprises a pair of gripping members mounted on the body for relative movement between an open position wherein the gripping members are spaced apart and the closed position wherein the gripping members come together to support said first electrode therebetween, and second cam means engageable between said actuating member and at least one of said gripping members to cam said gripping members from said open position to said closed position, whereby said first electrode can be positioned in abutment with the second electrode and the actuating member moved to cam the gripping members together to hold the first electrode in abutment with the second electrode, said first mentioned cam means being inoperative until said second cam means has closed the gripping members into engagement with the first electrode, and said first mentioned cam means then being operative to slide the actuator unit rearwardly in the bore for establishing said predetermined spacing between the electrodes.

References Cited
UNITED STATES PATENTS

| | | | |
|---|---|---|---|
| 1,534,070 | 4/1925 | MacFarland | 219—95 |
| 2,755,365 | 7/1956 | Frank | 219—95 X |
| 2,878,362 | 3/1959 | Quinlan | 219—95 X |
| 2,921,177 | 1/1960 | Gellatly et al. | 219—95 X |
| 2,941,065 | 6/1960 | Hartman | 219—98 |
| 3,254,193 | 5/1966 | Phillips | 219—95 |

RICHARD M. WOOD, *Primary Examiner.*

ANTHONY BARTIS, *Examiner.*

R. F. STAUBLY, *Assistant Examiner.*

UNITED STATES PATENT OFFICE
CERTIFICATE OF CORRECTION

Patent No. 3,325,621                                           June 13, 1967

Thomas W. Conrad

It is hereby certified that error appears in the above numbered patent requiring correction and that the said Letters Patent should read as corrected below.

Colum 12, lines 43, 65 and 69, strike out "accessory", each occurrence.

Signed and sealed this 26th day of December 1967.

(SEAL)
Attest:

Edward M. Fletcher, Jr.                                EDWARD J. BRENNER

Attesting Officer                                              Commissioner of Patents